United States Patent Office 3,330,692
Patented July 11, 1967

3,330,692
GLARE REDUCING OF GLASS
Joseph Ronald Ehrlich, New York, N.Y., assignor of fifty percent to Leonard Mackles, New York, N.Y.
No Drawing. Filed July 30, 1964, Ser. No. 386,406
2 Claims. (Cl. 117—159)

This invention relates to the reducing of glare and reflection of highly polished or glossy surfaces of glass, plastic or other materials. In particular it relates to the glare reduction of transparent materials, without substantially reducing the transparency of said materials. The kind of transparency which is being referred to in connections with this invention, for instance of a glass plate, is not that of complete clarity but is limited to the clear showing of a picture or print which is covered with said glass plate. In other words, anything in close contact with such a glass plate will be clearly visible through the plate, while objects in a certain distance cannot be seen clearly through the plate. The glare reduction referred to is manifested by complete scattering of incident light.

Glass with described properties is known as opalescent glass, opal glass, mat glass etc. It is being used for focussing screens, for picture framing, television screens etc., and according to the various uses they are being made in various degrees of "transparency." The glare reducing is either caused by a surface disturbance, of the originally glossy surface, and is normally produced by controlled chemical or mechanical etching. Also instead of a surface disturbance, it can be achieved by chemical or physical influences of the structure of the glass. Such glare reduction, as a rule, is factory produced and permanent.

The object of this invention is to produce a similar glare reduction and controlled transparency of clear materials such as clear glass or clear plastic which, however, can be easily removed, such as by washing with water. A further object is to simplify the production of said glare reduction in such a way that no factory equipment or "know-how" is necessary, and that every non-skilled person can make such "glare-proof" objects at home and at a much lower cost than the factory-made objects.

It is known that a shiny surface can be dulled, e.g., by putting a layer of wax on it, with or without a powdered material dispersed in it. So-called dulling paints will also remove gloss; so will finely ground pigments dispersed in a binder which will provide adhesion to the surface. Salt solutions, after evaporation of the solvent might leave dull crusts on a polishing surface. While all those various dulling agents might more or less successfully reduce glare of polished surfaces, they would opacify transparent glass or plastic to a degree where an object in close contact with one side of the glass or plastic would no longer be clearly visible on the opposite side. When referring to glare reducing of glass or plastic it is mostly thought of plates or sheets with plane surfaces. However, curved surfaces as can be found on television picture tubes or protective screens are an equally important form in connection with this invention.

Whenever reference is made in this specification to glass or to a glass plate it is meant to include plastic, and of any shape or thickness. The word "transparency" is used to express undiminished visibility of an object in close contact with a glass plate or a picture projected onto a glass plate through said glass plate; it does not mean clear glass such as a clean, clear windowpane or eyeglass, "undiminished" visibility means that the visibility through a glare free portion of a glass is substantially the same as through a glossy, light reflecting portion of the same glass. Expressions such as "glare free," "reduced glare," "glare reduction," etc., should express that the glass does not reflect images.

I have found that a perfect light scattering disturbance of a glossy surface on glass can be achieved by a thin layer or layers of microscopic, clear crystals, without impairing the transparency of the glass. I have discovered that water-soluble polymers of ethylene oxide within a certain range of molecular weights can be made to crystallize under certain conditions so as to create a crystal pattern on glass that is invisible to the naked eye and does not give the desired effect. To see the pattern requires considerable magnification, from about 30 times to 100 times, depending on molecular weight, and to resolve the details of the pattern requires an even larger magnification, from about 60 times to 300 times.

The crystals are spherulites and form a pattern that looks like a network of more or less regular polygons, mostly pentagons, hexagons and some others. These polygons are made up of smaller structures. In the center of many of them appears to be a nucleus consisting of a cluster of radiating small fibers. From this nucleus to the sides of the polygons run into all directions radii which divide the polygons into sections. Within each of such section can be seen a multitude of fibers, often oriented like a fan. The spherulites have a size from substantially 3 microns to substantially 40 microns. The well defined center area of these spherulites has a diameter which is about $\frac{1}{10}$ the size of the outer diameter.

The water-soluble ethylene oxide polymers, also referred to as polyethylene glycols which are useable for the purpose of this invention are in a range of molecular weights, estimated to range from substantially 6000 to substantially 80,000. The lower molecular weight products have a wax-like character. The higher molecular weight products are better described as resins. The products with about 6000 mol.w. are hard, wax-like, with a softening point of 60°–63° C. and a viscosity of 3700 Saybolt seconds at 210° F. Products with a molecular weight of 15,000–20,000 are wax-like, have a softening point of 50°–55° C. and a viscosity of 450,000 Saybolt seconds at 210° F. Products with 75,000 to 80,000 mol.w. are white resins with a softening point 65°–70° C.

Though these ethylene oxide polymers are water-soluble it is not possible to use their water solutions to form the light scattering coatings. The crystals can be formed from solutions of relatively low solid contents in certain solvents. For good transparency the solutions have to be of low concentration, from substantially .10% to substantially 10% solids content, preferably .5% to .75%, and the solvents of said solutions should have a high rate of evaporation and a relatively low boiling point. If light scattering alone, but no transparency is required, the evaporation can be slower, and the concentration higher. Solvents which are capable of dissolving polyoxyethylenes at room temperature are not too numerous and not all solvents which do dissove polyoxyethylenes, falling within the range of molecular weights which are usable for this invention, form solutions from which the desired crystallization can be achieved. When I speak of solvents, dissolving ethylene oxide polymers at room temperature I wish to point out that the solubility was determined in the following way: Polyoxyethylene was heated in the individual solvents to a temperature above 25° C. and allowed to come to room temperature of about 20° C. to 24° C., and observed as to whether it stayed in solution or precipitated. The findings refer to ethylene oxide polymers of an average molecular weight which can be used for the purpose of this invention as previously defined.

In addition to individual solvents there are also solvent blends which dissolve said ethylene oxide polymers and which promote the desired crystallization. Again, there are solvent blends which dissolve but do not promote the crystallization.

Examples of individual solvents for ethylene oxide polymers (600 to 80,000 mol. w.) promoting crystallization:

Methylene chloride
Propylenedichloride
Chloroform
Ethylenedichloride
Trichlorethylene
1,1-dichloroethane
1,1,1-trichloroethane
Ammoniumhydroxide
Tetrahydrofurane
Benzene
Dimethylformamide
Methanol Examples of solvent blends promoting crystallization:

Benzene+methylene chloride

Benzene+propylenedichloride

Benzene+chloroform

Benzene+ethylenedichloride

Benzene+trichlorethylene

Benzene+1,1-dichloroethane

Methylenechloride+toluene

Methylenechloride+xylene

Methylenechloride+methanol

Methylenechloride+trichlorofluoromethane

Methylenechloride+dichlorodifluoromethane

Methylenechloride+trichlorotrifluoro ethane

Methylenechloride+difluorochloromethane

Methylenechloride+petrolether

Methylenechloride+ethylether

Methylenechloride+acetone

Methylenechloride+MEK

Methylenechloride+carbontetrachloride

Methylenechloride+isopropylchloride

Propylenedichloride—petrolether

Examples of individual solvents for ethylene oxide polymers (6000–80,000 mol. w.) not promoting crystallization:

Carbontetrachloride
Dioxane
Freon 22
Isopropanol 91%
Water

Examples of blends which dissolve, but do not promote crystallization:

Benzene+methanol

Methylenechloride+ethanol 95%

Methylenechloride+isopropanol 99%

Methylenechloride+ethylene diamine

Methylenechloride+perchlorethylene

Acetone+water

Methylethylketone+water 1,4-dioxane+water

Tetrahydrofurane+water

Dimethylformamide+water

The singly underlined chemicals are non-solvents by themselves, and the twice underlined solvents are individual solvents for the particular ethylene oxide polymer.

On surfaces other than plastic any solvent, promoting crystallization can be used, while a solvent for use on plastic must be carefully chosen so as not to attack the plastic. For glare reduction without transparency solutions can be spread with any conventional method such as by brushing, wiping, etc. For glare reduction with transparency it is essential that the layer of spherulites does not exceed a certain thickness. As a matter of fact, such layers are very thin, and the best way to produce them is by spraying, especially from aerosol cans. However, the most desirable thickness also depends on the molecular weight of the polyethylene oxide being used. E.g., a polyethylene oxide with a molecular weight of about 75,000–80,000 a layer of about 0.0022 g. per sq./in. on glass gives a most satisfactory equilibrium of glare reduction and transparency. The minimum necessary to just produce some glare reduction with the same polyoxyethylene is about .00055 g. per sq./in.

With a polyoxyethylene of a molecular weight of about 20,000, e.g., the best equilibrium, that is complete glare reduction combined with excellent transparency is achieved by a coating of .0008 g. per sq./in. The minimum for producing some glare reduction is about .0001 g. per sq./in.

It should be noted that for good results the spherulites, in spite of the thin layer, apparently are not all in one plane but appear to be superimposed and situated in two or more parallel planes.

The crystalline structure of ethylene oxide polymers of the described molecular range is well known and described in literature. However, as far as I know, the crystalline structure of these thermoplastic polymers has been established from the behavior of solid state samples derived from methods other than from laying down in thin films from solutions. The crystallinity is expressed among others by the sharp melting point, by the nuclear magnetic reasonance patterns, by X-ray defraction, etc. The carefully made experiments above described, show, however, that there are solvents and solvent blends from which said ethylene oxide polymers do crystallize during and/or after the evaporation of the solvents but also that there are numerous solvent systems from which said polymers do not crystallize. As a greater number of actual or suggested applications of ethylene oxide polymers is based on their solubility in water, it is remarkable that the films laid down from water solutions or blends of water with organic solvents show no crystallization, at least not usable for the purpose of my invention.

Conclusively, it appears, that (a) There are many organic solvents which do not dissolve ethylene oxide polymers in the molecular range of substantially 6000 to 80,000;

(b) There are a number of individual solvents which do dissolve said ethylene oxide polymers which do not promote crystallization;

(c) There are a number of individual solvents for said ethylene oxide polymers which do promote crystallization;

(d) There are blends of solvents for said ethylene oxide polymers which do promote crystallization;

(e) There are blends of solvents for said polyoxyethylenes which do not promote crystallization, even if each component singly does promote crystallization (see example of benzene and methanol);

(f) There are blends of solvents with non-solvents for said polyoxyethylenes which do dissolve and do promote crystallization and, (g) There are blends of solvents with non-solvents for said ethylene oxide polymers which do dissolve but do not promote crystallization.

I could not find any clear pattern as to which type of solvents or solvent blends does or does not promote crystallization.

The solvents or solvent systems which dissolve said polyoxyethylenes and promote or do not promote crystallization can neither be brought in correlation with or be classified in accordance with any distinctive chemical groups of compounds, nor with any one of their physical properties. The only classification which can be applied in this case is purely functional: There are two distinctive groups of solvents and solvent systems, containing solvents only, or being a blend of solvents with non-solvents, one such group promoting crystallization and the other group NOT promoting crystallization.

This is a very special crystallization. I believe that it is neither the size, nor the transparency or opaqueness of crystals which cause transparency and light scattering on a glass plate at the same time. I have tried many other substances which crystallize from solutions in transparent or opaque crystals of microscopic size without creating transparency and light scattering on glass plates. Apparently it is the spacing and grouping of the polyoxyethylene crystals which causes this special effect. There appears to be sufficient space between the tiny crystals to give the impression of transparency, while the number, size, shape and grouping of the crystals is such as to scatter the light sufficiently to prevent reflection. Like a fast rotating propeller causes a blur, yet still permits to see what is behind the propeller.

I prefer to use such solvent systems where the crystallization takes place quickly, almost spontaneously and which permit very rapid drying. Thus, my preferred examples are those which use fast evaporating solvents and preferably blends of which at least one component evaporates very quickly and faster than the other liquid component or components.

*Examples*

(1) 0.1 gram of polyoxyethylene mol. w. 75,000–80,000 was dissolved in 99.9 grams of methylene chloride. A clear solution was obtained, which was brushed on a piece of glass covering a photograph, which upon drying, eliminated the reflected light from the glass but still allowed the photograph to be seen clearly and undistorted.

(2) A solution of polyoxyethylene mol. w. 15,000–20,000 was prepared composed as shown below, by simple stirring at room temperature. All percentages are given by weight.

|  | Percent |
|---|---|
| Polyoxyethylene mol. w. 15,000–20,000 | 7.50 |
| Benzene | 46.25 |
| Trichlorethylene | 46.25 |

The solution was sprayed on a glass television screen from a compressed air sprayer. The spray was such to aproximate a fine mist. Upon drying the TV picture could be observed clearly without distortion. Reflected glare from the glass which would normally be present was eliminated.

(3)

|  | P.p.w. |
|---|---|
| Polyoxyethylene mol. w. 75,000–80,000 | 0.75 |
| Methylene chloride | 42.25 |
| Dichlorodifluoro methane | 57.00 |

The above formula is an aerosol formulation. A good procedure for preparing the above product is by preparing first a 7.5% solution of the polyethyleneoxide in methylene chloride and diluting one part of this solution with 9 parts of methylene chloride. This solution can then be filled in aerosol cans in any way known to the art, e.g., under pressure or at low temperature using 43 parts of above solution and 57 parts of dichlorodifluoromethane. All parts by weight.

This aerosol preparation can be used for spraying on a glass TV screen. The spraying is best achieved by moving the spray can at a distance of 12 to 18 inches in front of the glass until a uniform coating is achieved. The spray hits the glass almost dry and the crystals start forming immediately. The dry coating can be wiped with a dry cloth for dusting without removing or damaging the microscopic crystals which cannot be distinguished with the naked eye. However, the coating can be easily removed with a sponge or wet rag, wetted with water, as the coating is soluble in water. Glare reduction is achieved quickly, using only little of the spraying liquid. The TV picture is clearly visible without distortion. The spherulites are relatively large, requiring a very thin coating.

(4)

|  | P.p.w. |
|---|---|
| Polyoxyethylene 75,000–80,000 mol. w. | .5 |
| Methylene chloride | 4.5 |
| Petrolether 35–40° C. B.P. | 10.0 |
| Monochlorodifluoro methane | 30.0 |
| Trichloromonofluoro methane | 55.0 |

This too is an aerosol formulation. Preparation of the product in accordance with standard procedures and behavior of the coating is very similar to the description given in Example 3. Some of this material was sprayed on a glass plate, used to cover a water color painting. The painting could then be seen without distortion and all reflected glare previously present was eliminated.

(5) A composition of the following ingredients was was loaded into an aerosol can by standard procedures. All percentages are by weight.

|  | Percent |
|---|---|
| Polyoxyethylene mol. w. 75,000–80,000 | 0.5 |
| Methylene chloride | 1.0 |
| Methanol | 3.5 |
| Monochlorodifluoro methane | 10.0 |
| Trichloromonofluoro methane | 55.0 |
| Dichlorodifluoro methane | 30.0 |

When the contents of the aerosol can was directed on to a plastic polystyrene TV screen as a fine spray, the reflected glare was eliminated while the TV picture remained undistorted.

Instead of using a polyoxyethylene with a molecular weight of 15,000–20,000, other types, such as molecular weight 75,000–80,000, or 20,000–75,000 or blends of any one of the above can be used in the above formulation or in any other of the examples. Polyoxyethylene types with a molecular weight of 20,000 and less produce much smaller spherulites than the coatings described in the Examples 1, 3 and 4. Transparency in that case is exceptionally good but the coating requires more spraying to achieve the same degree of glare reduction as in Examples 1, 3 and 4. However, by using molecular weight types higher than 20,000 the behavior of the spray and coating is similar to that in Examples 1, 3 and 4, regardless whether the coated surface is glass or plastic. Regardless which type of ethylene oxide polymer is used within the range of substantially 6000 to substantially 80,000, the coating is removable with water, but wipe-resistant when dry.

(6) The following composition was loaded into an aerosol can by standard procedures. All percentages are by weight.

|  | Percent |
|---|---|
| Polyoxyethylene mol. w. 15,000–20,000 | 0.25 |
| Polyoxyethylene mol. w. 75,000–80,000 | 0.25 |
| Methylene chloride | 1.00 |
| Monochlorodifluoro methane | 10.00 |
| Trichloromonofluoro methane | 55.00 |
| Dichlorodifluoro methane | 30.00 |

The above composition was sprayed on a polystyrene TV screen. Reflected glare was eliminated without distorting the TV picture.

Ethylene oxide polymers in many molecular weight ranges are known, e.g., from molecular weight of 200 to 1,000,000 and more. However, for the practical purpose of my invention only those which range from substantially 6000 to substantially 80,000 are useful. While my invention is limited to the use of ethylene oxide polymers in the molecular range as indicated, it is not limited to the above examples which are given, only to illustrate the invention. Many other variations within the framework of this specification can be used to achieve the goal of this invention.

I claim:

1. A transparent object, a surface of which is coated with a liquid which, after drying reduces the glare and reflection of said surface while keeping said object sufficiently transparent to permit complete visibility through said object of images which are in close contact with said object or are light-projected onto it, said coating being sufficiently adhesive to permit wiping with a dry cloth and being removable with water and wiping, said liquid consisting of a solution of ethylene oxide polymer of a molecular weight from substantially 6000 to substantially 80,000 in a volatile liquid medium which is a solvent for said ethylene oxide polymers at room temperature and which also promotes crystallization of said polymer, leaving as it evaporates a very thin layer of said polymer weighing at least .0001 gram per square inch, said layer exhibiting spherulite crystals, forming patterns of polygon-like shape made of still smaller crystal structures, said spherulites having a size from susbtantially 3 microns to substantially 40 microns and having a well-defined nucleus-like center area with a diameter considerably smaller than the outer diameter of said spherulites, said ethylene oxide polymer being present in the liquid in a concentration from from substantially 0.1% by weight to substantially 10% by weight.

2. A transparent object, a surface of which is coated with a liquid which, after drying reduces the glare and reflection of said surface, while keeping said object sufficiently transparent to permit complete visibility through said object of images which are in close contact with said object or are light-projected onto it, said coating being sufficiently adhesive to permit wiping with a dry cloth and being removable with water and wiping, said liquid comprising an ethylene oxide polymer of a molecular weight from substantially 6000 to susbtantially 80,000, and at least one solvent selected from the group consisting of methylene chloride, propylene dichloride, chloroform, ethylenedichloride, trichlorethylene, 1,1-dichloroethane, 1,1,1-trichloroethane, ammoniumhydroxide, tetrahydrofurane, benzene, toluene, xylene, dimethylformamide, methanol, trichlorofluoromethane, dichlorodifluoromethane, trichlorotrifluoro ethane, difluorochloromethane, petrolether, ethylether, acetone, methyl ethyl ketone, carbontetrachloride, and isopropylchloride, said liquid having a concentration of ethylene oxide polymer of said molecular weight from substantially 0.1% by weight to substantially 10% by weight, said liquid being applied to said surface in such amount that it leaves, after drying, a very thin coating of at least 0.0001 gram per square inch, said coating consisting of spherulite crystals, forming patterns of polygon-like shape made up of still smaller crystal structures, said spherulites having a size from substantially 3 microns to substantially 40 microns, said spherulites having a well defined center area with a diameter which is considerably smaller than the outer diameter of said spherulites.

References Cited

UNITED STATES PATENTS 2,617,780  11/1952  Lutz _____ 260—338
3,100,750  8/1963  Bailey et al. _____ 260—2

OTHER REFERENCES

Gaylord: "High Polymers," vol. XIII, part I, p. 117, 1963.

MORRIS LIEBMAN, *Primary Examiner.*

A. LIEBERMAN, *Assistant Examiner.*